UNITED STATES PATENT OFFICE 2,355,367

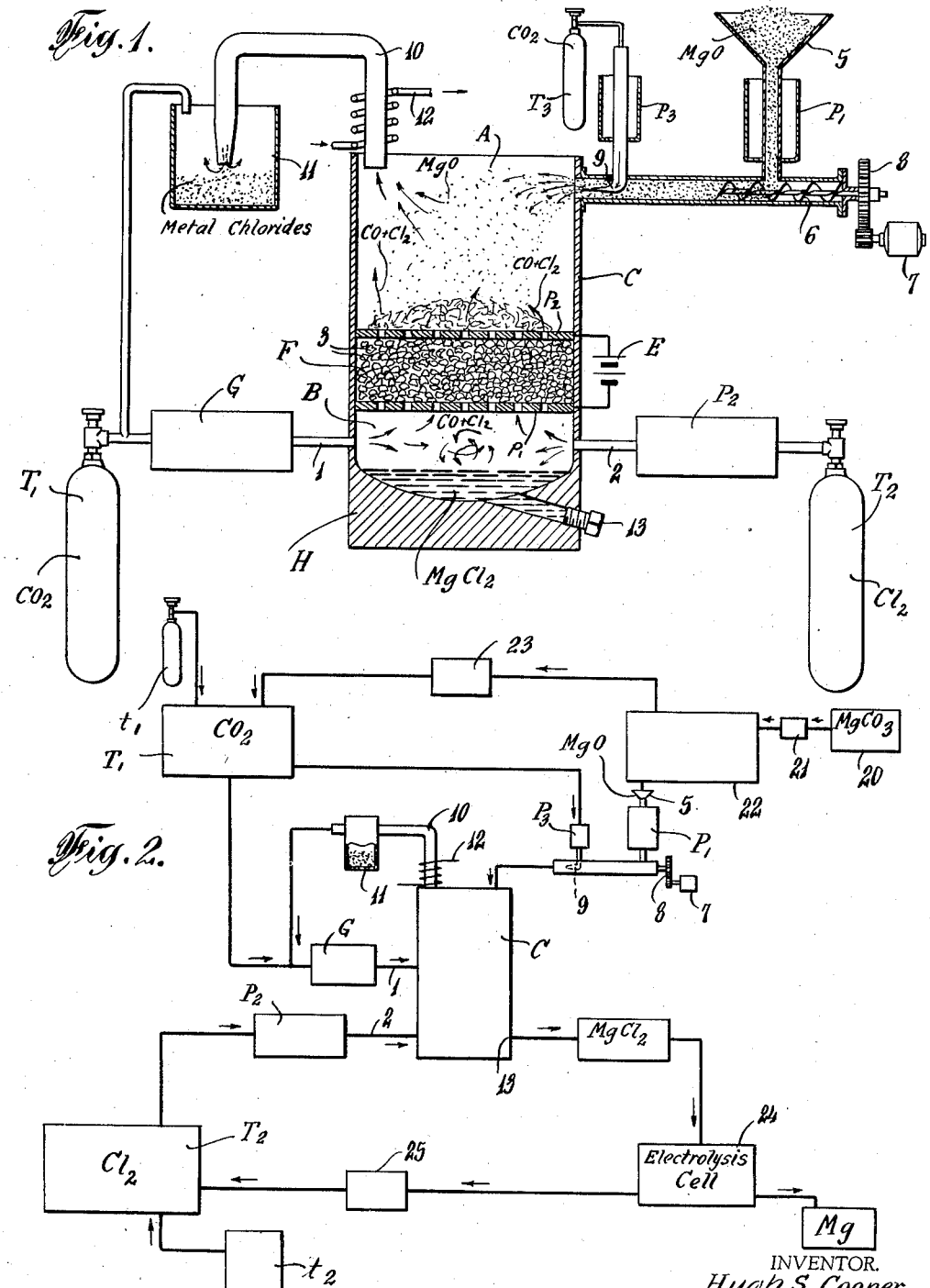

METHOD OF PRODUCING ANHYDROUS MgCl₂

Hugh S. Cooper, Cleveland, Ohio, assignor of one-half to Frank H. Wilson, Cleveland, Ohio Application June 28, 1941, Serial No. 400,184

4 Claims. (Cl. 23—91)

This invention relates to the production of anhydrous magnesium chloride and has for its object the provision of an economically practical method of converting magnesium oxide into anhydrous magnesium chloride.

Another object is to provide a method of producing anhydrous magnesium chloride which may be operated economically in a substantially closed system including a process for producing magnesium metal by the electrolysis of magnesium chloride and a process for calcining magnesite.

Other objects and advantages will be apparent as the invention is more fully hereinafter disclosed.

In accordance with these objects I have discovered that finely divided magnesium oxide is substantially completely and relatively rapidly converted to magnesium chloride by the combined action of the gases carbon monoxide and chlorine at a temperature approximating 1000° C., the reaction being that represented by the following equation:

$$MgO + CO + Cl_2 = MgCl_2 + CO_2$$

I have discovered that for the reaction to proceed at an economically practical rate the MgO and the gases CO and Cl₂ each must be preheated to the approximate temperature of 1000° C. before bringing the same into reactive contact within a chlorinating chamber.

In general, the reaction involved is one of reduction of the MgO by the CO with simultaneous chlorination of the Mg formed by the Cl₂ present. This reaction proceeds inwardly from the surface and for any given particle size MgO the time interval for complete chlorination varies directly with the temperature as the reduction reaction of the MgO by the CO is a reversible reaction requiring temperatures approximating 2000° C. for complete reduction. In the presence of chlorine, however, and at temperatures approximating 1000° C. the reduction rate is relatively rapid.

As the reduction and chlorination reaction proceeds inwardly from the surface of the MgO particle, the time interval required to obtain substantially complete chlorination of the MgO particle at the reaction temperature of about 1000° C. varies directly with the particle size and the smaller the particle size the shorter the time interval to obtain substantially complete chlorination. However, with any given particle size the rate of chlorination decreases as the chlorination reaction proceeds inwardly due to the forming of a film of fused magnesium chloride around the particle and complete chlorination is seldom attained except with extremely small particle sized material.

I have, therefore, found it preferable to filter the fused magnesium chloride as produced as hereinabove described through a carbon filter heated to temperatures approximating 1000° C. passing a mixture of the gases CO and Cl₂ through the filter counter current to the passage of the MgCl₂ therethrough, thus eliminating from the MgCl₂ the last traces of MgO contained therein.

In the practice of the present invention the reducing and chlorination reaction may be widely adapted without essential departure therefrom and many types of apparatus may be devised within which to practice the same. In the drawing, herewith accompanying, I have schematically illustrated in Fig. 1, one type of apparatus with associated preheating and dust collector means within which the present method invention may be practiced and in Fig. 2 I have diagrammatically illustrated a flow sheet of the present invention in association with apparatus for the electrolysis of the MgCl₂ produced and with apparatus for calcining magnesite (MgCO₃) to produce the MgO for chlorination in accordance with the practice of the present invention.

Referring to the apparatus of Fig. 1, the chlorination apparatus C is separated by porous filter F into two separate chambers A and B. Upper chamber A is the chlorinating chamber wherein the chlorinating reaction hereinabove described is performed. Chamber B is the gas mixing and MgCl₂ collecting chamber and is provided with a hearth H upon which the molten MgCl₂ collects after passing through porous filter F.

CO gas from generator G is introduced under pressure into lower chamber B through inlet port 1, the said CO gas being produced preferably by passing CO₂ from tank T, over carbon (coke) heated to temperatures within the range 900 to 1100° C. Chlorine gas from tank T₂ is passed through preheater P₂ wherein it is heated also to a temperature approximating 1000° C. and thence is fed into chamber B through inlet port 2.

The quantities of the two gases CO and Cl₂ are maintained in the relative proportions approximately that required for the reaction $$MgO + CO + Cl_2 = MgCl_2 + CO_2$$

and the total quantities of the two gases is at least sufficient to maintain a relatively strong free flow of the mixture of gases through the apparatus.

Porous filter F comprises a pair of spaced perforated carbon plates $p_1$ and $p_2$, the space gap therebetween being filled with granular carbon 3 packed sufficiently closely together and in contact with plates $p_1$ and $p_2$ to provide a high resistance electric path along which electrical energy from an electrical source such as battery E may be passed, the intensity of the current being regulated to incandesce the filter F to temperatures approximating 1000° C.

Finely divided MgO, preferably of a particle size below about 100 mesh is passed from bin 5 through preheater $P_1$ wherein it is heated to temperatures approximating 1000° C. and onto screw conveyor 6 rotatably driven by motor 7 through reduction gears 8 to aspirator means 9 operated by $CO_2$ gas from tank $T_3$ from which aspirator means 9 the MgO is blown into the top of chamber A and admixed with the ascending mixture of the gases CO and $Cl_2$. Preferably the $CO_2$ before entering the aspirator 9 is preheated by preheater means $P_3$ to temperatures approximating 1000° C. so that the MgO as it is brought into dispersed reactive contact with the gases CO and $Cl_2$ in chamber A will have a temperature approximating 1000° C.

As the reaction between the MgO and the gases CO and $Cl_2$ in accordance with the above reaction is exothermic liberating about 75 K. cal. per molecular reacting weights, I have found that the temperature of the MgO may be materially lower than 1000° C. at the moment of introduction into chamber A without essential deleterious effect on the reaction where the particle size of the MgO is exceedingly fine or where the MgO consists in large part of particles of a size below about 200 mesh, however, the temperature of the MgO in no case should be permitted to drop below about 900° C. On the other hand, temperatures in excess of about 1100° C. should be avoided in chamber A as excessive vaporization of the $MgCl_2$ formed in the reaction occurs, and the method of introducing the MgO by aspirating the same into the chamber A with preheated $CO_2$ affords a convenient way of controlling the temperature in chamber A by varying the pressure of the $CO_2$ passing through the aspirator, the temperature of the same or both.

The effluent gases from chamber A pass through discharge conduit 10 to dust collector 11 and preferably in passing from the chamber A is subjected to cooling by cooling means 12 to temperatures approximating 850° C. to condense the $MgCl_2$ vapors therein to the liquid phase thereby to inhibit losses of $MgCl_2$ in the effluent gases passing to dust collector 11.

Dust collector 11 preferably also is water cooled to temperatures of approximating 300° C. to precipitate all vaporized metal chlorides contained therein and the mixture of gases remaining consisting of $CO_2$, CO, $Cl_2$, together with some $COCl_2$ formed at temperatures below about 600° C. may be treated for the isolation and recovery of the same or alternatively may be passed over carbon heated to temperatures within the range 900–1100° C. to recondition the mixture of gases for recirculation through the apparatus in admixture with the CO and $Cl_2$ normally being fed thereto as hereinabove described.

As hereinabove indicated, the reduction and chlorination reaction in chamber A is relatively rapid at temperatures approximating 1000° C. and the completeness of the same varies with respect to the particle size. With any given gas pressure in chamber A, however, there is an optimum minimum particle size below which it is impractical to go on account of excessive losses incident to the carrying over of unreacted MgO dust by the effluent gases. With any given gas pressure, however, relatively wide variation in particle sizes above this optimum minimum size may be employed without deleterious results inasmuch as by filtering the condensed $MgCl_2$ through porous filter F countercurrent to the passage of the mixture of gases therethrough substantially all MgO residues in the $MgCl_2$ are effectively removed therefrom by chlorination before the $MgCl_2$ drains onto hearth H.

By maintaining the operating temperature within chamber A and filter F substantially uniformly at a temperature of about 1000° C. the $MgCl_2$ formed is freely fluid and drains rapidly through the filter F onto hearth H and the gas pressure within the apparatus C may be maintained relatively low.

Referring now to the flow sheet diagram of Fig. 2, $MgCO_3$ (magnesite) from storage bin 20 after passing through grinding means 21 wherein it is reduced to the desired particle size, is passed through kiln 22 wherein it is thermally dissociated into MgO and $CO_2$. The MgO passes to bin 5, thence through preheater $P_1$ and is fed into the chlorinating apparatus C by conveyor means 6 and aspirator means 9 as hereinabove described. The $CO_2$ from kiln 22 is exhausted to purifier and compressor means 23 and thence under pressure into storage tank $T_1$ from which the $CO_2$ to operate aspirator means 9 may be drawn.

Chlorine from electrolytic cell 24 wherein $MgCl_2$ is decomposed into Mg and $Cl_2$ is passed through compressor and purifier means 25 and supplied under pressure to tank $T_2$. The source of supply of $MgCl_2$ for cell 24 may be the apparatus C or an external source of supply may be at least in part employed.

Chlorine and $CO_2$ for the chlorination of MgO in apparatus C may be drawn from tanks $T_2$ and $T_1$ respectively, any deficit being made up from supplementary tanks $t_2$ and $t_1$ respectively, and the effluent gases from apparatus C after passing through dust collector 11 may be recirculated through the apparatus C by being fed in admixture with the $CO_2$ from tank $T_1$ through CO-generator G or, alternatively by being fed through a separate CO-generator (not shown) and returned to chamber B for admixture with the CO and $Cl_2$ being supplied thereto.

The economies of operating the cyclic process schematically illustrated in Fig. 2 is believed apparent to one skilled in the art. By recirculating the effluent gases through the chlorinating apparatus C and prior to such recirculation converting the $CO_2$ content into CO and thermally decomposing all of the phosgene content thereof by passing the gas over heated carbon the major addition to be made thereto would be chlorine. The chlorine loss incident to the fixing of some of the chlorine as metal chlorides in dust collector 11 and the chlorine losses in electrolysis cell 24 must be continuously replaced by $Cl_2$ from supplemental tank $t_2$. As $CO_2$ is relatively inexpensive the recovery of the $CO_2$ from kiln 22 and the purification and compressing of the same for delivery to storage tank $T_1$ could be dispensed with without serious deleterious results to the economies of the process.

Having hereinabove described the present invention generically and specifically it is believed apparent that the same may be widely varied without essential departure therefrom and all such modifications and adaptations of the same are contemplated as may fall within the scope of the following claims:

What I claim is:

1. The method of producing anhydrous $MgCl_2$ substantially free from MgO which comprises dispersing MgO of relatively small particle size below about 100 mesh heated to temperatures approximating 1000° C. into the top of an ascending column of a reducing and chlorinating gas mixture consisting of the gases carbon monoxide and chlorine in approximately equal molecular proportions heated to temperatures approximating 1000° C. to convert the MgO to liquid $MgCl_2$, collecting the $MgCl_2$ formed during the free fall of the MgO particles through the said column upon a porous filter heated to temperatures approximating 1000° C. and flowing said reducing and chlorinating gas through said filter countercurrent to the draining of said $MgCl_2$ therethrough to a collecting hearth.

2. The method of forming fused magnesium chloride substantially free of magnesium oxides which comprises dispersing magnesium oxide having a particle size below about 100 mesh and a temperature approximating 1000° C. in a vertically ascending column of a reducing-chlorinating gas mixture consisting of carbon monoxide and chlorine heated to a temperature approximating 1000° C. at a point adjacent the top of said column for substantially free vertical fall therethrough to convert the MgO particles to $MgCl_2$ in the liquid state, collecting the magnesium chloride upon a porous filter heated to temperatures approximating 1000° C. and flowing the same through said filter countercurrent to the passage of said gas mixture therethrough into said column.

3. The method of forming fused anhydrous magnesium chloride substantially free from magnesium oxide, which comprises dispersing the magnesium oxide having a particle size below about 100 mesh and having a temperature approximating 1000° C. in a vertically rising column of a reducing-chlorinating gas mixture consisting of CO and $Cl_2$ in approximately equal molecular proportions and having a temperature approximating 1000° C. at a height above the bottom thereof providing for substantially complete reduction and chlorination of each particle of said MgO and conversion of the same to magnesium chloride in the liquid state in vertically falling to the bottom of said column, collecting the magnesium chloride on a porous filter heated to temperatures approximating 1000° C. and flowing the same through the said filter countercurrent to the passage of said gas mixture therethrough into said column.

4. The method of forming fused anhydrous magnesium chloride substantially free from MgO, which comprises suspending MgO having a particle size below about 100 mesh and having a temperature of from 900–1100° C. in a vertically ascending column of a reducing-chlorinating gas mixture consisting of carbon monoxide and chlorine in approximately equal molecular proportions, and heated to a temperature of about 1000° C., collecting the liquid magnesium chloride formed by the action of said gas mixture on the suspended MgO particles upon the surface of a porous filter heated to a temperature approximating 1000° C. located at the bottom of said column and flowing the said liquid magnesium chloride downwardly through the said filter countercurrent to the passage of said reducing-chlorinating gas mixture through the said filter into said column.

HUGH S. COOPER.